United States Patent
Parks et al.

(10) Patent No.: US 7,702,310 B1
(45) Date of Patent: Apr. 20, 2010

(54) LOAD BALANCING MANAGEMENT OF COMMUNICATIONS SESSIONS IN A COMMUNICATIONS MANAGEMENT NETWORK

(75) Inventors: Michael Parks, Piedmont, CA (US); John Karsner, Benicia, CA (US); John Bednarz, Oakland, CA (US); John Bamforth, Pittsburg, CA (US); James Gamm, Clayton, CA (US)

(73) Assignee: Virgin Mobile USA, L.P., Warrent, NJ (US)

( * ) Notice: Subject to any disclaimer, the term of this patent is extended or adjusted under 35 U.S.C. 154(b) by 0 days.

(21) Appl. No.: 12/420,003

(22) Filed: Apr. 7, 2009

Related U.S. Application Data (62) Division of application No. 11/062,194, filed on Feb. 18, 2005, now Pat. No. 7,532,875.

(51) Int. Cl.
*H04M 11/00* (2006.01)

(52) U.S. Cl. .................. 455/405; 455/408; 370/352; 379/211.02

(58) Field of Classification Search .............. 370/352, 370/522; 455/408, 406
See application file for complete search history.

(56) References Cited

U.S. PATENT DOCUMENTS

| | | | |
|---|---|---|---|
| 6,430,406 B1 | 8/2002 | Frisk | |
| 6,697,477 B2 * | 2/2004 | Fleischer et al. | 379/211.02 |
| 6,813,488 B2 | 11/2004 | March et al. | |
| 2003/0008635 A1 * | 1/2003 | Ung et al. | 455/408 |
| 2004/0076281 A1 | 4/2004 | Dahari | |
| 2004/0151292 A1 | 8/2004 | Larsen | |
| 2005/0063366 A1 * | 3/2005 | Wheeler et al. | 370/352 |

OTHER PUBLICATIONS

United States Office Action, U.S. Appl. No. 12/420,005, Aug. 11, 2009, 7 pages.

* cited by examiner

*Primary Examiner*—David Q Nguyen
(74) *Attorney, Agent, or Firm*—Fenwick & West LLP (57) ABSTRACT

A communications management network for managing subscribers' communication sessions. The management network includes multiple sets of session management modules or servers (e.g., Intelligent Service Control Points), a services hub and a data warehouse. The network may also include a gateway for routing text messages. Each set of session management modules includes a plurality of modules, and each subscriber is assigned to one set of modules with one of the modules as a primary and another as a secondary or backup. Subscribers are grouped according to geographical area (e.g., by zip code, by area code), service area or other criteria, and all subscribers within a group are assigned to the same primary and secondary modules. Management of subscribers' communication sessions is load balanced by reassigning groups of subscribers to different sets of session management modules. Each module tracks account statuses (e.g., prepaid services balances) for its assigned subscribers.

10 Claims, 3 Drawing Sheets

LOAD BALANCING MANAGEMENT OF COMMUNICATIONS SESSIONS IN A COMMUNICATIONS MANAGEMENT NETWORK

CROSS REFERENCE TO RELATED APPLICATIONS

This application is a division of U.S. application Ser. No. 11/062,194, filed Feb. 18, 2005, which is incorporated by reference in its entirety.

BACKGROUND

This invention relates to the fields of communications and computer systems. More particularly, a scalable communications management network architecture is provided for managing subscriber communication sessions.

As mobile communications become more widely accepted, providers are offering an ever-increasing variety of services, including prepaid services. With prepaid services, a customer purchases a predetermined number of wireless communication credits or minutes. Because the customer has prepaid for the services, he or she does not need to enter into a credit agreement with the service provider or demonstrate an acceptable credit history. Prepaid wireless communication services are especially attractive to young adults who are unable or unwilling to enter into long-term credit commitments of the kind required for traditional mobile communication service arrangements.

Providers of prepaid communication services naturally wish to ensure that their customers' service usage does not exceed their prepaid credits. Therefore, providers generally automate the process of tracking their customers' service usage, maintaining their credit balances and managing their communication sessions. As more and more subscribers join a provider, the burden placed on the provider's management network or system increases commensurately. In addition to the tasks associated with enabling and controlling individual communication sessions, the provider's management network may also be responsible for tasks such as provisioning new customers' accounts, routing SMS (Short Message Service) messages, monitoring network statuses, etc.

However, computer systems employed by the provider to manage customer accounts and credit balances have finite processing limits. Traditionally, when such a processing limit was approached, the provider would replace or reconfigure the computer system. This could entail significant expense and labor costs, in addition to a possible loss of service availability for some period of time.

Therefore, there is a need for a communications management network architecture that is easily scalable to support increasing numbers of customers, without the costs and risk of service outage inherent in traditional architectures.

In addition, with prepaid communication services a customer must replenish his or her account in a timely manner in order to avoid service termination. However, it is very easy for a customer to forget to perform such replenishment. And, if the customer is very active, he or she may have to replenish frequently, especially if replenishing with small sums. Depending on how often the customer must replenish, the complexity of replenishment and any fees that may assessed the customer, repeated replenishment may become onerous.

Thus, there is also a need for a method of automatically replenishing a customer's prepaid communication services balance.

SUMMARY

In one embodiment of the invention, a communications management network is provided for managing subscribers' communication sessions. The management network includes multiple sets of session management modules or servers (e.g., ISCPs or Intelligent Service Control Points), a services hub and a data warehouse. The network may also include a gateway for routing text messages. The communications management network is configured to manage communication sessions (e.g., telephone calls, text messages) established or placed with a communications switching network that is coupled to the communications management network.

Each set of session management modules includes a plurality of modules, and each subscriber is assigned to a specific module set, with one of the modules serving as a primary module and another as a secondary or backup module. Subscribers are grouped according to geographical area (e.g., by zip code, by area code), service area or other criteria, with all subscribers within a group assigned to the same primary and secondary modules. Each module tracks account statuses (e.g., prepaid communication services balances) for its assigned subscribers, and may allow or reject a communication session based on the subscriber's account status.

The services hub is configured to provision the communications switching network using codes or identities of the session management modules to which a subscriber is assigned. The data warehouse may include subscriber account and activity information, network statuses, and other data for use in managing subscriber sessions. The data warehouse may be maintained by the services hub, but may share data with the session management modules.

Subscribers' communication traffic can be easily managed by reassigning groups of subscribers to different sets of session management modules and re-provisioning the communications switching network. For example, when a new set of modules is brought online, selected groups (e.g., customer areas) of users may be moved to the new modules, and corresponding updates made to records in the data warehouse.

In another embodiment of the invention, a method is provided for automatically replenishing a subscriber's prepaid communication services balance. When the subscriber's balance falls below a threshold, a warning message is generated and transmitted to the subscriber. Instead, the subscriber's account is automatically replenished using the subscriber's specified source (e.g., credit card, debit card). The user is then notified of the replenishment (e.g., via text message). Replenishment may be accomplished using any fund source (e.g., credit card, debit card).

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a scalable communications management network is provided. In this embodiment, the network is scaled (e.g., expanded) as needed to accommodate additional subscribers. In particular, as network capacity is consumed by new subscribers or by increasing subscriber activity, additional resources may be brought online to increase capacity. In addition, subscriber activity and management of subscribers' communication sessions can easily be load balanced across the management network. An implementation of this embodiment of the invention may be suited for management of prepaid communication services, wherein each subscriber's prepaid credit balance is monitored and updated in real time.

In another embodiment of the invention, a method is provided for automatically adding credits or minutes to a subscriber's account before her prepaid credits are exhausted.

Figure 1:
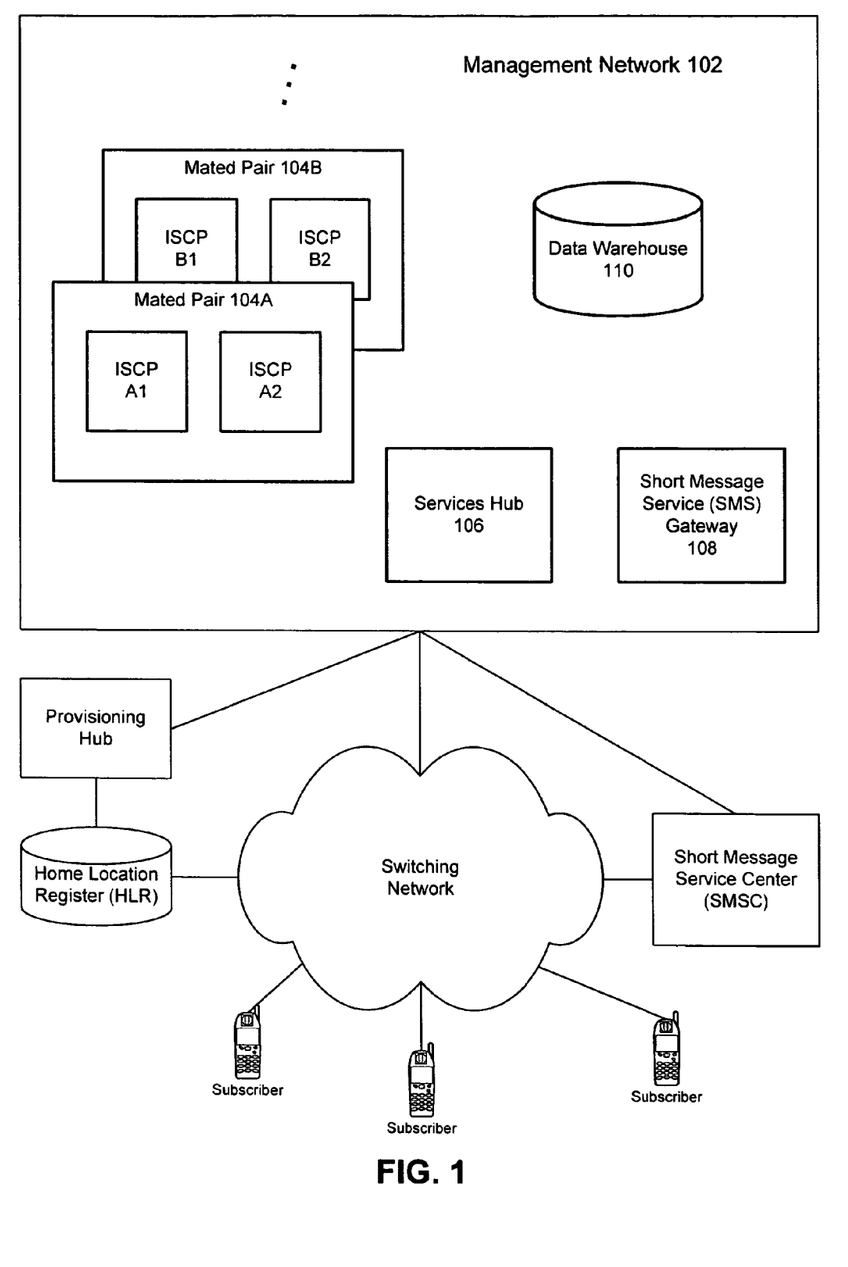
FIG. 1 is a block diagram depicting a scalable communications management network, in accordance with an embodiment of the present invention.

FIG. 1 depicts scalable communications management network 102 for managing prepaid communication services, according to one embodiment of the invention. In this embodiment, network 102 is coupled to a communications switching network operated by a communication service provider such as Sprint or AT&T.

In one embodiment, the communication switching network is an SS7 (Signaling System 7) network, and is configured to establish and switch calls between communication subscribers using virtually any type of communication devices (e.g., mobile telephone, traditional wired handset, text message device). The switching network may also provide services such as call waiting, caller identification, voice mail, text messaging, ring tones, Internet access, etc. In different implementations, the communications switching network comprises any number of Mobile Switching Centers (MSC) and communication links.

As one skilled in the art will recognize, the communications switching network includes a Home Location Register (HLR), which is a database for storing service profiles and other information regarding communication service subscribers. Other entities that perform the same functions as an HLR may be implemented instead, but the term HLR is used herein to refer to any such entity performing these functions.

In one embodiment of the invention, when a new call is received from a subscriber, a switching center within the communications switching network identifies the subscriber (e.g., by an Electronic Serial Number (ESN) of the subscriber's handset) and queries the HLR to determine where the call should be managed or controlled. The HLR responds by identifying the appropriate ISCP (Intelligent Service Control Point) module or similar device operated by the provider of the subscriber's communication services. The switching center then queries the ISCP module to determine how the call request should be handled. The switching center also informs the ISCP module when the call is completed; this allows the ISCP module to charge the subscriber or decrement his or her prepaid balance correctly.

In the illustrated embodiment, the call itself need not be switched or trunked to the ISCP module. As may be appreciated, text messages received in the switching network may be routed to the appropriate provider's management network in a similar fashion.

Management network 102 comprises one or more mated pairs 104 of ISCP modules, services hub 106, SMS (Short Message Service) gateway 108 and data warehouse 110. In alternative embodiments of the invention, management network 102 may comprise more or fewer components than are depicted in FIG. 1, or the functionality of the network components may differ from the following description.

The ISCP modules of mated pairs 104 may be provided by Telcordia Technologies Inc., and are configured according to the requirements of the management network operator to provide intelligent network services. The ISCP modules, alone or in combination with other components of the management network, provide management services such as rate metering, Internet access, credit allocation and so on. Some services may be configurable by subscribers (e.g., without involving human agents of the management network).

For example, an ISCP module may be configured for web-based management and provisioning of subscriber services, and may allow self-provisioning by subscribers. Because they are capable of managing subscriber communication sessions (e.g., to ensure subscribers possess sufficient credits or minutes), ISCP modules may be termed session management modules or servers.

The ISCP modules are compatible with switching devices deployed in the communication switching network, and may therefore be configured to operate under any of a plurality of communication or signaling protocols. In particular, ISCP modules may be assigned SS7 point codes to make them addressable through the switching network.

Each mated pair 104 includes two or more ISCP modules for redundancy, so that if one module fails, its processing load is assumed by the remaining module(s). The ISCP modules within a mated pair may share local storage (e.g., a database) and/or each may be configured with its own storage. As described below, each subscriber is allocated to a mated pair 104, which maintains the subscriber's prepaid services balance and manages his or her communication sessions (e.g., calls, text messages). One of the modules in the assigned mated pair serves as the primary module for managing the subscriber's activity, and another is a secondary or backup module. ISCP modules are also able to access other data stored in the management network such as that stored in data warehouse 110.

Services hub 106 comprises one or more computer servers or systems configured to facilitate provisioning of subscriber accounts and services, load balancing of subscribers across mated pairs 104, maintenance of management data (e.g., some or all of data warehouse 110), and other functions. In one embodiment of the invention, a computer system deployed as part of services hub 106 is configured with web services or application software provided by BEA Systems, Inc.

In the embodiment of the invention depicted in FIG. 1, for a new subscriber, services hub 106 first provisions the allocated mated pair 104 with the subscriber's service plan. The service plan identifies the subscriber's authorized services (e.g., caller ID), the rate(s) at which the services are to be charged, and other information describing how to treat the subscriber. The services hub then provisions the HLR of the communications switching network with the service plan. The subscriber may be re-provisioned at any time (e.g., to re-assign him or her to a different mated pair) in a similar manner.

In this embodiment, the services hub does not provision the HLR directly. Instead, services hub 106 provisions a provisioning hub for the switching network, and the provisioning hub provisions the HLR. The interface between services hub 106 and the provisioning hub may be developed by or in conjunction with the operator of management network 102.

SMS (Short Message Service) gateway 108 routes SMS or other text messages toward their intended recipients. In the embodiment of the invention depicted in FIG. 1, SMS gateway 108 routes messages through an SMSC (Short Message Service Center) for delivery via the communications switching network. A message addressed to a recipient having a different communication provider than the provider operating management network 102 is delivered through an inter-carrier gateway (not shown in FIG. 1) for delivery via a second switching network.

Data warehouse 110 stores data for facilitating the operation of management network 102, tracking subscriber activity, maintaining subscriber accounts and provisioning subscribers' services. The data may be divided into any number of databases provided by Oracle Corporation, Siebel Systems Inc., or other sources, and may be stored on any number or type of computing devices. Thus, data warehouse 110 may include multiple computer systems distributed throughout management network 102. Contents of data warehouse 110 may be maintained by services hub 106, ISCP modules or other components of the management network.

When a new subscriber's prepaid communication services are provisioned within management network 102, the subscriber's telephone handset identifier is associated with a particular ISCP module (or mated pair) 104, by reference to the point code, network address or other identity of the ISCP module. A backup module may also be assigned. For example, in FIG. 1 a new subscriber may be assigned a primary ISCP module of A1 and a secondary ISCP module of A2. The assigned primary and secondary ISCP modules are normally part of the same mated pair.

When the subscriber places a call, management of the call is routed through the primary ISCP module (or the secondary if the primary is unavailable). The call is completed to the called party only if the ISCP module verifies that the subscriber has not exhausted all prepaid credits or minutes. If verification fails, the ISCP module instructs the communications switching network (i.e., the switch that is handling the call) to drop the call. In one embodiment, the subscriber's credit balance is maintained in real time on the assigned ISCP modules. Illustratively, the switching network notifies the ISCP module when the call is completed.

In an embodiment of the invention, one of the databases or data collections of data warehouse 110 maps zip codes (or other defined areas or collections of subscribers) to specific ISCP modules (e.g., a primary and a secondary). In this embodiment, all subscribers within a particular area are therefore associated or provisioned with the same primary and secondary modules. To load balance subscribers among the various mated pairs in this embodiment of the invention, entire zip codes can be reassigned from one mated pair to another. Thus, when a new mated pair is brought online, subscribers in selected geographical regions may be moved to the new pair. In other embodiments of the invention, subscribers are grouped in a manner other than geographical area (e.g., area code, prefix of their telephone number, service plan).

Figure 2:
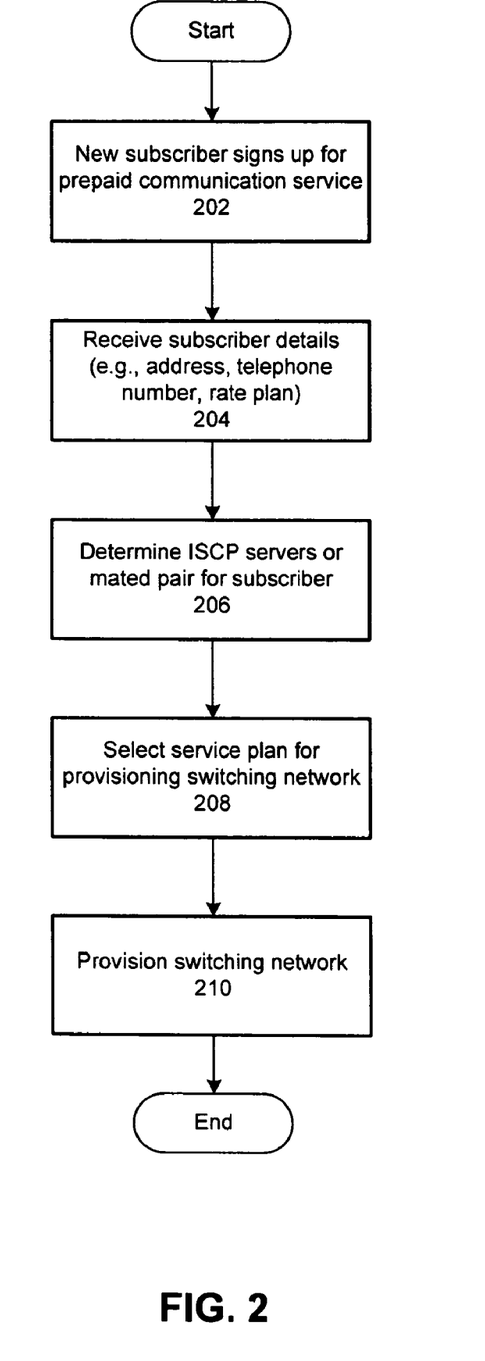
FIG. 2 is a flowchart illustrating one method of provisioning a new subscriber, in accordance with an embodiment of the present invention.

FIG. 2 is a flowchart demonstrating a method for provisioning a new subscriber within a scalable communications management network, according to one embodiment of the invention. In this embodiment, the management network enables a provider of prepaid communication services to manage subscribers' calls and credit balances. Subscribers' calls may be carried and switched by another communication provider's switching network.

In operation 202, a new subscriber requests or signs up for prepaid communication services. This may be accomplished in various ways, including via the service provider's website or via telephone.

In operation 204, the provider may receive various subscriber details, such as name, address, telephone identification (e.g., telephone number, type or model of handset, handset identifier) and the rate or service plan desired by the subscriber.

In operation 206, the provider's management network is employed to determine which ISCP module or modules (e.g., primary and secondary) in a mated pair of modules the new subscriber should be assigned to. In this embodiment of the invention, the provider maintains a data warehouse that includes data for facilitating this determination. For example, the data may identify customer service areas (CSA) for subscribers, which may be based on a zip code, area code, address or other information regarding the subscribers. The data may also identify the ISCP modules or mated pair that subscribers in a particular CSA should be assigned to.

In operation 208, a service plan for provisioning the new subscriber's service is identified or selected. The service plan comprises a set of service order codes (SOC) configured to identify the assigned ISCP module(s), the services to be provided to the subscriber, the applicable rate plan and any other information necessary for provisioning the subscriber's communication services.

In operation 210, the communications switching network is provisioned with the service plan. In the illustrated method, the services hub of the management network transmits the service plan to the switching network's provisioning hub. The provisioning hub then uses the service plan to provision the switching network's HLR.

One SOC in the service plan comprises a trigger variable identifying the primary and secondary ISCP modules selected for the subscriber. For example, in the embodiment of the invention depicted in FIG. 1, WN05 may be the trigger variable encoded within an SOC to provision a subscriber with a primary ISCP module of A1 and a secondary of A2. That variable is translated by the communications switching network (e.g., provisioning hub, HLR) to point codes of the corresponding ISCP modules. Thus, for different subscribers, different trigger variables are provided during the provisioning to assign the subscribers to different ISCP modules.

As one skilled in the art may appreciate, traditionally a telephone service subscriber would be provisioned, in the communications network, with point codes identifying specific ISCP modules of the service provider's management network. These point codes were called a trigger set. The management network identified a set of modules by their point codes or network addresses, not a variable that could be dynamically redefined. Once the, management network provisioned the switching network and the switching network configured the subscriber's trigger set, the management network generally could not change the trigger set.

In the illustrated embodiment of the invention, however, the management network (services hub 106 of FIG. 1) enjoys a more flexible interface with the communications switching network. In particular, the management network can alter a subscriber's trigger set or associated ISCP modules by specifying a different trigger variable in another SOC. For example, referring again to FIG. 1, services hub 106 may send to the provisioning hub a different service plan comprising a SOC containing a different trigger variable (e.g., WN07) to reassign the new subscriber to a primary ISCP module of B2 and a secondary ISCP module of B1. In one alternative embodiment, multiple trigger variables may be assigned to a subscriber. In this alternative embodiment, a subscriber could have both primary and secondary mated pairs of ISCP modules, with each mated pair having primary and secondary modules.

Thus, by connecting to the switching network's provisioning hub or asynchronously submitting an activation request with the appropriate SOCs, the service hub can provision a subscriber with desired services (e.g., voice mail, call waiting, caller identification, text messaging) and associate the subscriber with a set of ISCP modules for managing the subscriber's activity. As a result, changing a subscriber's managing ISCP modules is as easy as adding or dropping a service (i.e., by issuing a new service plan containing the appropriate SOC).

When a subscriber places a telephone call, the call setup request is received in a communications switching network at an MSC or other switching device. The MSC identifies the subscriber's handset from data accompanying the call, and broadcasts a message asking for the manager or "owner" of the subscriber. An HLR responds and identifies the subscriber's primary ISCP module (and possibly the secondary module).

The MSC then contacts the primary ISCP module (or the secondary if the primary is down) and identifies the subscriber (or the subscriber's handset) and the call destination (i.e., the called number). The ISCP module verifies that the identified subscriber is a valid subscriber and has sufficient prepaid service credits to pay for the call. The ISCP module may also determine from the subscriber's rate plan the rate at which the call should be charged. The ISCP module then responds to the MSC and indicates that the call should be completed. If, however, the subscriber or handset is invalid or the subscriber has no credits, the ISCP module would instruct the MSC to drop the call. A suitable voice or text message may be played or transmitted to the subscriber to inform him that his credits have been exhausted.

When a subscriber transmits a text message, it is also received by an MSC or other component of the communications switching network. The MSC determines who manages the subscriber or transmitting device and forwards the message to the assigned ISCP module(s). If the message is destined for another subscriber of the management network, after the sender's identity and service status (e.g., credit balance) are verified, the message is forwarded through an SMS gateway and the same communications switching network to the indicated recipient. If the message is addressed to a subscriber of a different service provider, or some other switching network must be traversed, the message is forwarded to an inter-service carrier.

In one embodiment of the invention, a method is provided for automatically replenishing a subscriber's prepaid communication services before his or her prepaid service credits or minutes are exhausted. Implementations of this embodiment discussed herein are suitable for use with a communications management network such as the one described in conjunction with FIG. 1. Implementations suitable for other environments may be derived from the following discussion.

In this embodiment, automatic replenishment is initiated when the Management network detects that a subscriber's prepaid services balance has fallen below a-predetermined threshold, as measured by credits, minutes, monetary value or other indicia. Different thresholds may be established for different subscribers (e.g., based on their rate plan).

The diminished balance may be detected by an ISCP module (e.g., the primary or secondary module to which the subscriber is assigned), the services hub, or another component of the management network. In this embodiment, replenishment is performed automatically and possibly without prior notification to the subscriber.

Figure 3:
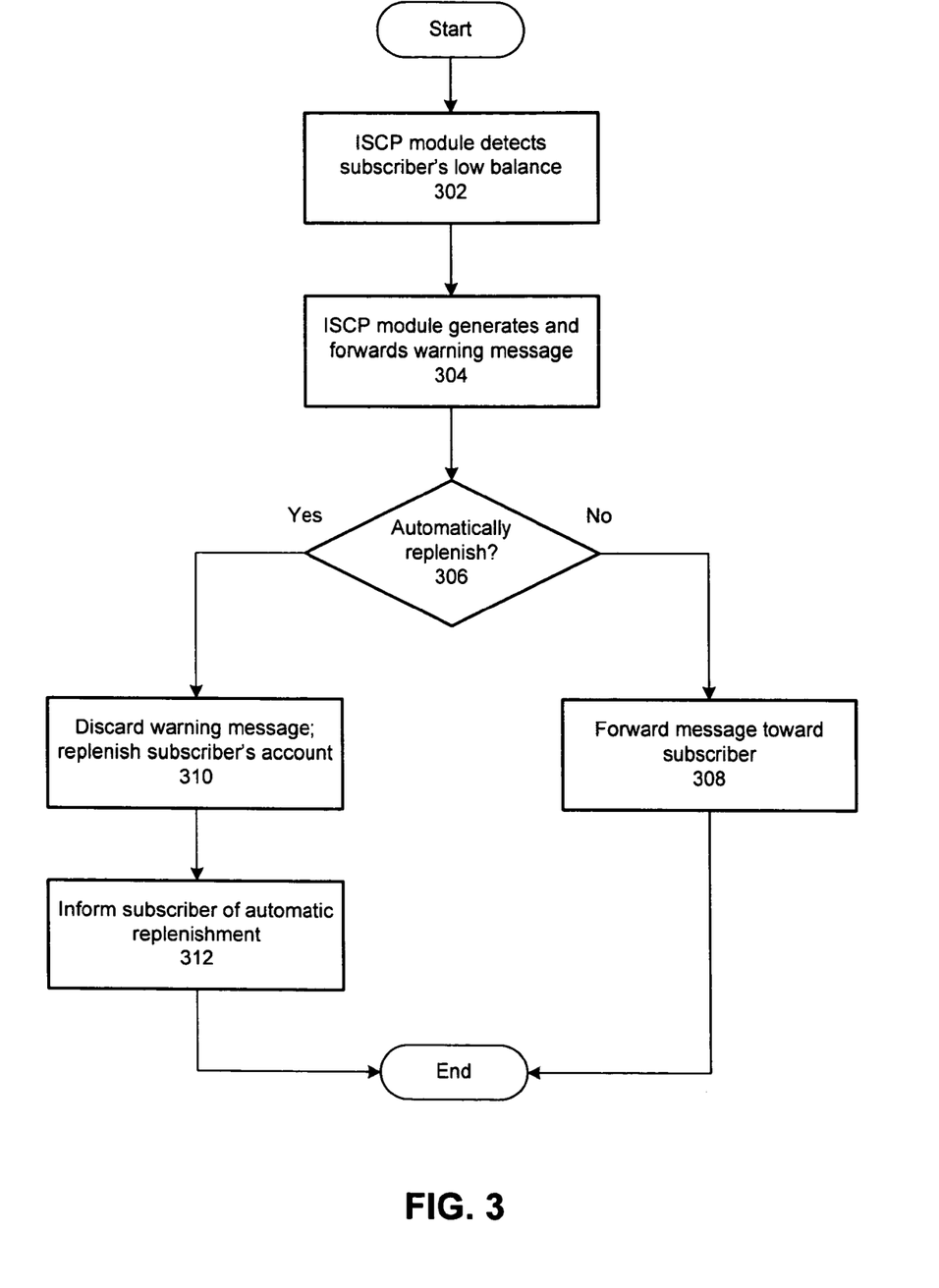
FIG. 3 is a flowchart illustrating one method of automatically replenishing a subscriber's prepaid communication services balance, in accordance with an embodiment of the present invention.

FIG. 3 demonstrates a method of automatically replenishing a subscriber's prepaid services balance, according to one embodiment of the invention. In operation 302, an ISCP module to which a subscriber is assigned detects that the subscriber's prepaid services balance has fallen below a predetermined threshold (e.g., five dollars, thirty minutes). The low balance may be detected while the subscriber is active (e.g., during a telephone call) or inactive.

In operation 304, the ISCP module automatically generates a text (e.g., SMS) message or other communication directed to the subscriber, to notify the subscriber of a low balance. The message is forwarded to a gateway (e.g., SMS gateway 108 of FIG. 1) capable of routing or forwarding the message toward the subscriber (e.g., through a communications switching network).

In operation 306, the gateway determines whether the subscriber has requested or approved automatic replenishment. This determination may be made by accessing data stored in a data warehouse or by querying the services hub. Illustratively, the subscriber's profile is maintained in the data warehouse or by the services hub, and reveals this information. If the subscriber has approved automatic replenishment, the illustrated method continues at operation 310. Otherwise, in operation 308, the low balance warning message is forwarded toward the subscriber and the method ends. The subscriber will therefore need to replenish his or her account by direct interaction with the system in order to prevent service termination.

In operation 310, the subscriber has approved automatic replenishment. Therefore, instead of forwarding the warning message, the gateway discards the message and initiates automatic replenishment. In this implementation, automatic replenishment is executed by the services hub, which maintains or has access to data (e.g., in the data warehouse) describing the subscriber's default means for replenishment. Making a payment or transferring money may be employed using credit card, debit card or ACH (Automated Clearing House) transaction. The services hub may contact a third-party payment facilitator to make the necessary charge, debit or transfer of funds.

In operation 312, the subscriber is informed of the automatic replenishment. In the illustrated method, after the automatic replenishment is verified, the services hub notifies the gateway, which then forwards a text message to the subscriber. After operation 312, the method ends.

In alternative implementations, the various actions described above may be performed by other components of the management network without exceeding the scope of the invention. For example, when an ISCP module detects a low prepaid services balance it may notify the services hub. The services hub may then determine whether to initiate automatic replenishment (e.g., if approved by the subscriber), and will generate/forward the appropriate message via the gateway.

In another alternative implementation, the ISCP module possesses or accesses information indicating whether a subscriber has approved automatic replenishment. The ISCP module therefore separately instructs the services hub to initiate automatic replenishment, if appropriate, and forwards the appropriate message to the gateway for delivery to the subscriber.

The program environment in which an embodiment of the invention is executed illustratively incorporates a general-purpose computer or a special purpose device such as computing device configured for a specific communications management function. Details of such devices (e.g., processor, memory, data storage, display) were omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method for load balancing management of subscribers' communications sessions in a communications management network, the method comprising:
    configuring a plurality of server sets, wherein each server set comprises two or more session management servers configured to manage subscribers' communication sessions;
    for each session management server in a server set, configuring a service order code to provision the session management server as a primary session management server and a different session management sever in the server set as a secondary session management server;
    associating a different service order code with each of multiple collections of subscribers, wherein each subscriber belongs to one of the collections of subscribers; and
    load balancing management of the subscribers' communication sessions among the server sets by provisioning a communications switching network with the service order codes associated with each subscriber's collection of subscribers, wherein provisioning the communications switching network comprises, for each subscriber in a first collection of subscribers, facilitating registration of the service order code associated with the first collection of subscribers with a home location register of the communications switching network.

2. The method of claim 1, wherein the home location register is configured to facilitate management of a subscriber communication session by:
    receiving notification of the session;
    facilitating routing of control of the session to one of the primary session management server and the secondary session management server associated with the subscriber's collection of subscribers.

3. The method of claim 1, further comprising:
    changing the service order code associated with a first collection of subscribers; and
    re-load balancing management of the subscribers' communication sessions by re-provisioning the communications switching network with the changed service order code for the first collection of subscribers.

4. The method of claim 1, further comprising:
    configuring a new server set;
    for each session management server in the new server set, configuring a new service order code to provision the session management server as a primary session management server and a different session management sever in the server set as a secondary session management server;
    replacing service order codes of one or more collections of subscribers with one of the new service order codes; and
    re-load balancing management of the subscribers' communication sessions by re-provisioning the communications switching network with the new service order codes for the one or more collections of subscribers.

5. The method of claim 1, wherein a session management server manages a subscriber's communication session by tracking the subscriber's use of prepaid communication credits.

6. A computer readable storage medium storing instructions that, when executed by a computer, cause the computer to perform a method for load balancing management of subscribers' communications sessions in a communications management network, the method comprising:
    configuring a plurality of server sets, wherein each server set comprises two or more session management servers configured to manage subscribers' communication sessions;
    for each session management server in a server set, configuring a service order code to provision the session management server as a primary session management server and a different session management sever in the server set as a secondary session management server;
    associating a different service order code with each of multiple collections of subscribers, wherein each subscriber belongs to one of the collections of subscribers; and
    load balancing management of the subscribers' communication sessions among the server sets by provisioning a communications switching network with the service order codes associated with each subscriber's collection of subscribers, wherein provisioning the communications switching network comprises, for each subscriber in a first collection of subscribers, facilitating registration of the service order code associated with the first collection of subscribers with a home location register of the communications switching network.

7. The computer readable storage medium of claim 6, wherein the home location register is configured to facilitate management of a subscriber communication session by:
    receiving notification of the session;
    facilitating routing of control of the session to one of the primary session management server and the secondary session management server associated with the subscriber's collection of subscribers.

8. The computer readable storage medium of claim 6, further storing instructions that, when executed by a computer, cause the computer to perform a method that further comprises:
    changing the service order code associated with a first collection of subscribers; and re-load balancing management of the subscribers' communication sessions by re-provisioning the communications switching network with the changed service order code for the first collection of subscribers.

9. The computer readable storage medium of claim 6, further storing instructions that, when executed by a computer, cause the computer to perform a method that further comprises:

configuring a new server set;

for each session management server in the new server set, configuring a new service order code to provision the session management server as a primary session management server and a different session management sever in the server set as a secondary session management server;

replacing service order codes of one or more collections of subscribers with one of the new service order codes; and re-load balancing management of the subscribers' communication sessions by re-provisioning the communications switching network with the new service order codes for the one or more collections of subscribers.

10. The computer readable storage medium of claim 6, wherein a session management server manages a subscriber's communication session by tracking the subscriber's use of prepaid communication credits.

* * * * *

UNITED STATES PATENT AND TRADEMARK OFFICE
CERTIFICATE OF CORRECTION

PATENT NO. : 7,702,310 B2  Page 1 of 1
APPLICATION NO. : 12/420003
DATED : April 20, 2010
INVENTOR(S) : Michael Parks et al.

It is certified that error appears in the above-identified patent and that said Letters Patent is hereby corrected as shown below:

Column 9, line 44, Claim 1, change "sever" to "server";
Column 10, line 14, Claim 4, change "sever" to "server";
Column 10, line 38, Claim 6, change "sever" to "server"; and
Column 12, line 1, Claim 9, change "sever" to "server".

Signed and Sealed this

Tenth Day of August, 2010

David J. Kappos
*Director of the United States Patent and Trademark Office*